United States Patent [19]

Yamaura et al.

[11] Patent Number: 4,612,594
[45] Date of Patent: Sep. 16, 1986

[54] PROTECTIVE RELAY SYSTEM AND SAMPLING SYNCHRONIZING METHOD THEREFOR

[75] Inventors: Mitsuru Yamaura, Hachioji; Ituo Shuto, Fuchu, both of Japan

[73] Assignee: Kabushiki Kaisha Toshiba, Japan

[21] Appl. No.: 639,357

[22] Filed: Aug. 10, 1984

[30] Foreign Application Priority Data

Aug. 12, 1983 [JP] Japan .................................. 58-147347

[51] Int. Cl.$^4$ ............................................. H02H 7/26
[52] U.S. Cl. ......................................... 361/68; 361/66; 340/310 R; 455/51
[58] Field of Search ........................ 361/64, 65, 66, 68, 361/69, 79, 81, 83; 340/825.2, 870.13; 455/51, 80, 73, 212, 213; 375/107, 108, 109, 111

[56] References Cited

U.S. PATENT DOCUMENTS

| | | | |
|---|---|---|---|
| 3,849,763 | 12/1974 | Greene, Jr. ............................ | 371/22 |
| 4,071,873 | 1/1978 | Andow et al. ......................... | 361/68 |
| 4,183,072 | 1/1980 | Takagi et al. .......................... | 361/79 |
| 4,228,476 | 10/1980 | Okita et al. ............................ | 361/68 |
| 4,322,768 | 3/1982 | Maeda et al. .......................... | 361/64 |
| 4,371,908 | 2/1983 | Andow et al. ......................... | 361/68 |
| 4,470,093 | 9/1984 | Yamaura ............................... | 361/68 |

FOREIGN PATENT DOCUMENTS

| | | |
|---|---|---|
| 0078517 | of 0000 | European Pat. Off. . |
| 50-49645 | 2/1975 | Japan . |
| 2000399 | of 0000 | United Kingdom . |
| 2072974 | of 0000 | United Kingdom . |

OTHER PUBLICATIONS

"Signal Synchronish System" abstract of patent abstract of Japan, vol. 3, No. 132.

Primary Examiner—A. D. Pellinen
Assistant Examiner—A. Jonathan Wysocki
Attorney, Agent, or Firm—Schwartz, Jeffery, Schwaab, Mack, Blumenthal & Evans

[57] ABSTRACT

In a protective relay system for an electric power system having two terminals at which electrical quantity is sampled in synchronism with a clock signal produced at each terminal, and the sampled electrical quantity data are exchanged for protection at said opposite terminal: a synchronous signal is transmitted from each terminal toward the opposite terminal; time data T1 is transmitted from a first terminal SS2 toward a second terminal SS1, the time data T1 indicating a time point $t_1$ of the transmission of the synchronous signal toward the second terminal SS1 with reference to the clock signal; the time data T0 is transmitted from the second terminal SS1 toward the first terminal SS2, subsequent to reception of the synchronous signal from the first terminal SS2, the time data T0 indicating a value $$t_0 - T1 + t_2$$

where $t_0$ represents a time point of the reception of the synchronous signal with reference to the clock signal at the second terminal SS1, T1 represents the value as indicated by the time data T1, and $t_2$ represents a time point of the transmission of the synchronous signal with reference to the clock signal; a time deviation $\Delta T$ in the occurrence of the clock signal between the two terminals is determined from the time data T0 and a time point $t_3$ of the reception of the synchronous signal with reference to the clock signal; and the timing of the occurrence of the clock signal at said one terminal is adjusted in accordance with $\Delta T$.

13 Claims, 14 Drawing Figures

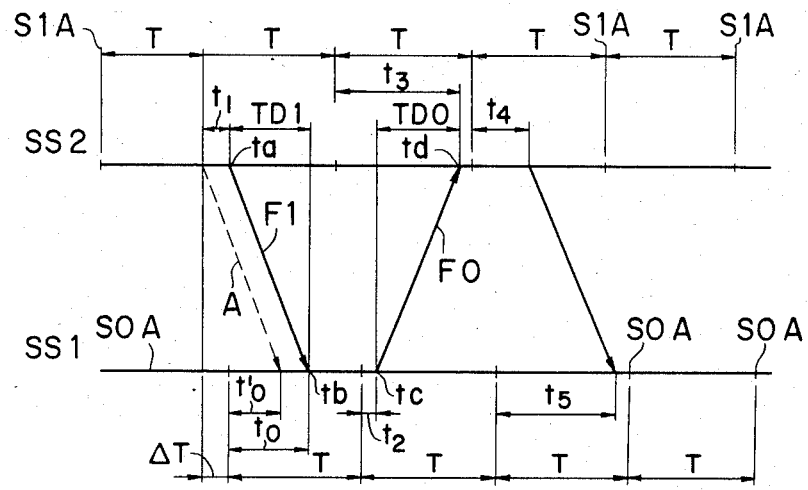

PROTECTIVE RELAY SYSTEM AND SAMPLING SYNCHRONIZING METHOD THEREFOR

BACKGROUND OF THE INVENTION

The present invention relates to a protective relay system for an electric power system and a sampling synchronizing method for synchronizing the sampling of electrical quantity at a plurality of terminals.

A protective relay system is known in which electrical quantity, such as electric current, is sampled at a plurality of positions or terminals in an electric power system, such as a power transmission system, and electrical quantity data in digital form obtained by the sampling is exchanged between the terminals and used for calculation for the purpose of the protective function. In such a system, the sampling at the respective terminals must be synchronized, i.e., the time at which the electrical quantity is sampled at the respective terminals must be made to coincide accurately, to ensure that electrical quantity data obtained by sampling simultaneously is used for the calculation.

There have been proposed various methods for synchronizing the sampling. In a method disclosed in Japanese Patent Application Laid-Open (Kokai) No. 110716/1979, the time of the transmission of the digital signal with respect to the time of the sampling is controlled to maintain a predetermined relation to the time of receipt of the digital signal from the opposite terminal with respect to the time of the sampling. A disadvantage of this system is relatively long delay of the transmission of the digital signal after the sampling. Such delay can become as long as almost one sampling period or interval. It is desirable that such delay be avoided particularly where quick-response protection of the electric power system is desired.

In another method which is disclosed in Japanese Patent Application Laid-open (Kokai) No. 49645/1975, the time of transmission of a digital signal relative to the sampling is fixed or maintained constant, and the digital data transmitted contains cyclic additional data indicating indicium or number (1, 2, ... n). At each terminal, subsequent to reception of a digital signal of a certain number (i, $1 \leq i \leq n$), a digital signal of the identical number (i) is transmitted. The length of time from the transmission of the digital signal of a certain number to the subsequent reception of a digital signal of the same number is measured at both terminals, and the sampling timing is adjusted so that the above-mentioned lengths of time measured at the both terminals become equal to each other. A disadvantage of the system in that the amount of information or data to be transmitted is relatively large.

In a further method proposed in Japanese Patent Application No. 173643/1981 the time point of transmission of a digital signal at each terminal is fixed relative to occurrence of the clock signal at each terminal, and data indicating the time point of reception of the digital signal from the opposite terminal with reference to the occurrence of the clock signal is transmitted to the opposite terminal, and the time deviation in the occurrence of the clock signal between the terminals is determined at each terminal in accordance with the time data from the opposite terminal, a time point of reception of the digital signal from the opposite terminal and a time point of the preceding transmission of the digital signal toward the opposite terminal, and the timing of occurrence of the clock signal is adjusted in accordance with the time deviation. A disadvantage of this method is that it is necessary to fix the time point of transmission of a digital signal relative to the time point of occurrence of the clock signal.

SUMMARY OF THE INVENTION

An object of the invention is to minimize the delay in the transmission of the electrical quantity data, and to minimize the amount of information or data to be transmitted for the purpose of the synchronization, and to reduce restriction on the time point of transmission of the electrical quantity data.

According to the invention, there is provided a sampling synchronizing method for use in a protective relay system for an electric power system having two or more terminals at which electrical quantity is sampled, two of the terminals being coupled to form a pair, said sampling at each terminal being made in synchronism with a clock signal produced at each terminal, and electrical quantity data obtained by the sampling at each terminal of said pair is transmitted to the opposite terminal of said pair to be used for protection at said opposite terminal, the clock signals at the terminals of said pair having the same frequency, wherein a synchronous signal is transmitted from each terminal of said pair toward the opposite terminal;

time data T1 is transmitted from one terminal SS2 of said pair toward the other terminal SS1 of said pair, in association with the synchronous signal, the time data T1 indicating a time point $t_1$ of the transmission of the synchronous signal toward said other terminal with reference to occurrence of the clock signal at said one terminal;

time data T0 is transmitted from said other terminal toward said one terminal, in association with the synchronous signal F0 is an $M_0$-th clock period ($M_0$ being a predetermined natural number) after the reception of the synchronous signal F1 associated with the time data T1 from said one terminal, the time data T0 indicating a value given by:

$$t_0 - T1 + t_2$$

where $t_0$ represents a time point of the reception of the synchronous signal F1 associated with the time data T1 from said one terminal SS2 with reference to occurrence of the clock signal at said other terminal SS1, T1 represents a value indicated by the time data T1, and $t_2$ represents a time point of said transmission of the synchronous signal F0 associated with the time data T0 toward said one terminal SS2 with reference to occurrence of the clock signal at said other terminal SS1, and a time deviation $\Delta T$ in the occurrence of the clock signal between said pair of terminals is determined at said one terminal in accordance with the time data T0 and a time point $t_3$ of the reception of the synchronous signal F0 associated with the time data T0 from said other terminal with reference to occurrence of the clock signal; and the timing of the occurrence of the clock signal at said one terminal is adjusted in accordance with the time deviation $\Delta T$.

According to another aspect of the invention, there is provided a protective relay system for an electric power system having two or more terminals, two of the terminals being coupled to form a pair, and relay devices each provided at each of the terminals of said pair for sampling electrical quantity in synchronism with a clock signal produced at each of the terminals of said pair and producing electrical quantity data indicating the sampled electrical quantity, and data exchange devices each provided at each of the terminals of said pair for transmitting the electrical quantity data toward the opposite terminal of said pair and receiving the electrical quantity data transmitted from the opposite terminal of said pair, said relay device at each terminal of said pair being responsive to the electrical quantity data transmitted from the opposite terminal for performing protection of the electric power system, the clock signals at the terminals of said pair having the same frequency, said data exchange device at each terminal comprising a clock signal generating circuit periodically generating said clock signal, and a transmitting circuit transmitting a synchronous signal toward the opposite terminal;

the data exchange device 9 of one terminal SS2 of said pair comprises a time data forming means 24 for producing time data T1 indicating the time point $t_1$ of the transmission of the synchronous signal F1 toward the other terminal SS1 with reference to occurrence of the clock signal at said one terminal SS2;

the transmitting circuit 21 of said one terminal SS2 transmits the time data T1 in association with the synchronous signal F1;

the transmitting circuit 11 of said other terminal SS1 transmits the synchronous signal F0 in an $M_0$-th clock period ($M_0$ being a predetermined natural number) after the reception of the synchronous signal F1 associated with the time data T1 from said one terminal, the data exchange device 5 of said other terminal SS1 further comprises a time data forming means 14 for producing time data T0 indicating a value given by $$t_0 - T1 + t_2$$

where $t_0$ represents a time point of the reception of the synchronous signal F1 associated with the time data T1 from said one terminal SS2 with reference to occurrence of the clock signal at said other terminal SS1, T1 represents a value indicated by the time data T1, and $t_2$ represents a time point of said transmission of the synchronous signal F0 toward said one terminal SS2 with reference to occurrence of the clock signal at said other terminal SS1, the transmitting circuit 11 of said other terminal SS1 also transmits the time data T0 in association with said synchronous signal F0, the data exchange device 9 of said one terminal SS2 further comprises a time deviation detecting means 25 for determining time deviation ΔT in the occurrence of the clock signal between said pair of terminals, in accordance with the time data T0, and the time point $t_3$ of reception of the clock signal F0 associated with the time data T0 from said other terminal SS1 with reference to occurrence of the clock signal at said one terminal SS2, and the clock signal generating circuit 23 of said one terminal SS2 is responsive to the time deviation ΔT for so adjusting the timing of the occurrence of the clock signal as to make the deviation closer to zero.

BRIEF DESCRIPTION OF THE DRAWINGS

In the accompanying drawings:

FIGS. 3A and 3B are diagrams showing the clock pulses produced by the clock signal generating circuit 13 shown in FIG. 2;

FIGS. 4A and 4B are diagrams showing the format of the digital data frame I0, I1 exchanged between the terminals;

FIGS. 5 through 8 are time charts illustrating the clock pulses S0A, S0B at the opposite terminals and the exchange of the synchronous signals F0, F1;

DESCRIPTION OF A PREFERRED EMBODIMENT

Figure 1:
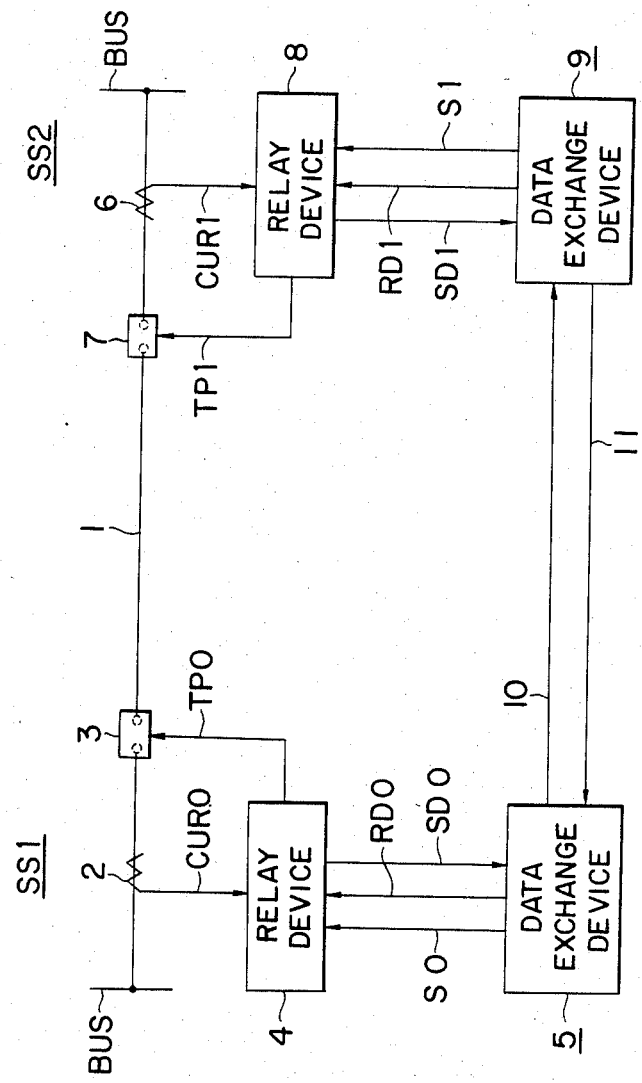
FIG. 1 is a block diagram showing a protective relay system.

Referring now more particularly to FIG. 1, there is shown a protective relay system comprising a pair of relay devices 4 and 8 provided at a "master" terminal SS1 and a "servant" terminal SS2 opposite to each other across a transmission line 1. Provided at the respective terminals are current transformers 2 and 6 for detecting the current through the transmission line 1, circuit breakers 3 and 7 operative responsive to the relay devices 4 and 8, and data exchange devices 5 and 9 associated with the respective relay devices 4 and 8 and exchanging data between the terminals SS1 and SS2. The reason why the terminals SS1 and SS2 are respectively called a master and a servant terminals is that the timing of occurrence of a clock signal at the terminal SS2 are so adjusted that it coincides with the timing of occurrence of a clock signal at the terminal SS1.

The relay devices 4 and 8 respectively receive the currents CUR0 and CUR1 from the secondary windings of the current transformers 2 and 6 and periodically sample the currents and digitize them to obtain current data SD0 and SD1 which are exchanged between the data exchange devices 5 and 9 and used for calculation for protective function in the relay devices 4 and 8. When, as a result of the calculation, the transmission line 1 is found to be in a state requiring disconnection, the relay devices 4 and 8 produce trip signals TP0 and TP1 to cause operation or tripping of the circuit breakers 3 and 7.

Figure 2:
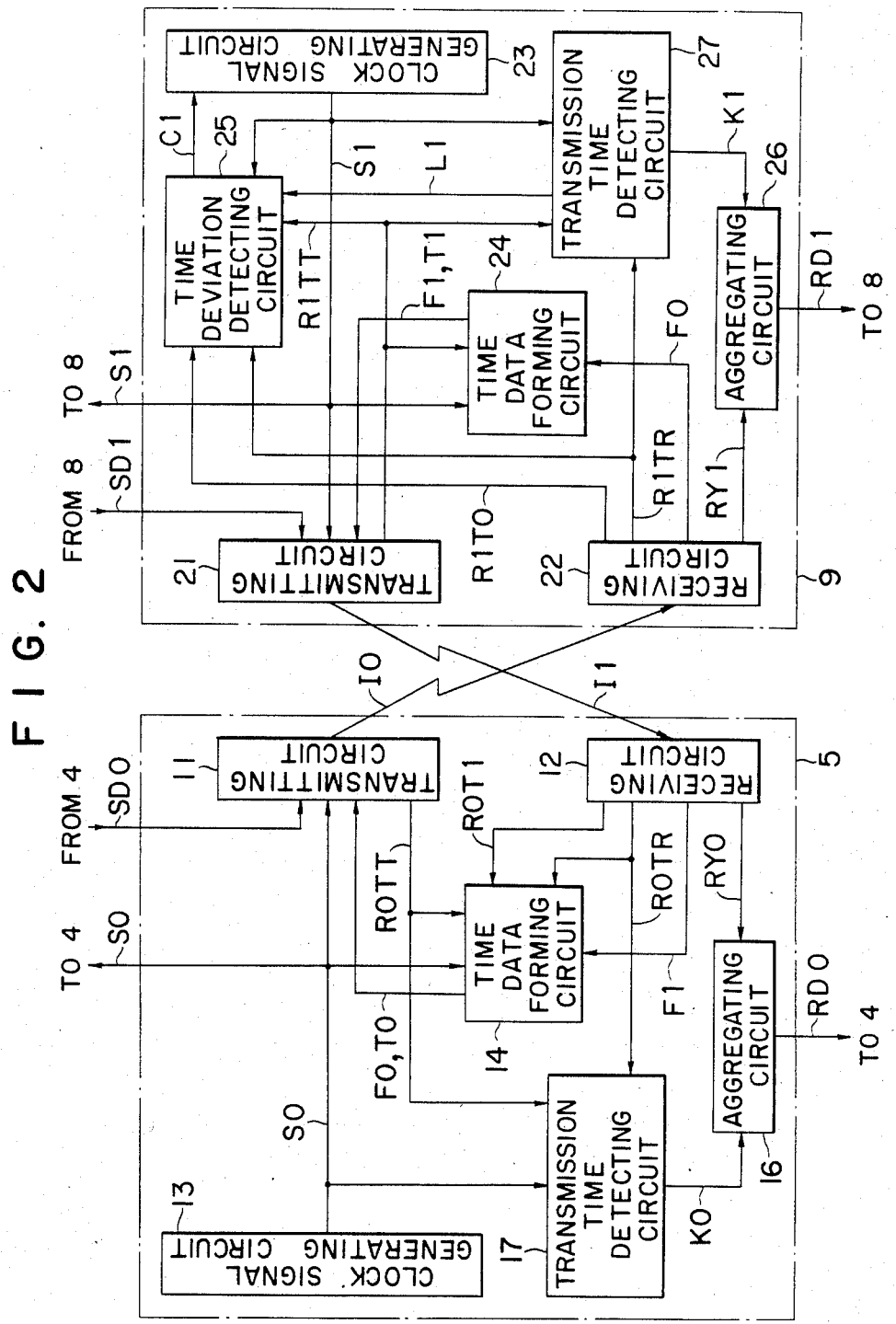
FIG. 2 is a block diagram showing data exchange devices at opposite terminals according to an embodiment of the invention.

FIG. 2 shows the internal construction of the data exchange devices 5 and 9. Clock signal generating circuits 13 and 23, each comprising a well-known oscillator, generate periodical clock signals S0 and S1 at the same frequency. The clock signals S0 and S1 respectively include first clock pulses S0A and S0B (FIG. 3A) produced at the same frequency, and are supplied to the relay devices 4 and 8. The sampling of the currents at the relay devices 4 and 8 is effected in synchronism with and in the same fixed relationship with the occurrence of the clock pulses S0A and S1A. For instance, the sampling is effected simultaneously with the occurrence of the clock pulses S0A, S0B. The clock signals S0 and S1 also include clock pulses S0B and S1B (FIG. 3B) produced at the same frequency. The frequency of the clock pulses S0B and S1B is a multiple of the frequency of the clock pulses S0A and S1A and the clock pulses S0B and S1B are synchronized with the clock pulses S0A and S1A. Such relationship between the clock pulses S0A and S1A, and S0B and S1B can be achieved by forming the clock pulses S0A and S1A by frequency-dividing the clock pulses S0B and S1B.

Signal transmitting circuits 11 and 21 receive current data SD0 and SD1 from the relay devices 4 and 8, and transmit, toward the data exchange devices 9 and 5 of the opposite terminals, the data SD0 and SD1 as part of digital data frames I0 and I1, shown in FIG. 4A and FIG. 4B. The transfer of the current data SD0 and SD1 from the relay devices 4 and 8 to the transmitting circuits 11 and 12, and the transmission of the data frames I0 and I1 are effected upon every occurrence of the pulses S0A and S1A, but not necessarily in synchronism with or in a fixed time relation with the occurrence of the pulses S0A and S1A. When a certain condition, which will be described later, is fulfilled at either terminal, synchronous signal F0 or F1 is produced by a time data forming circuit 14 or 24 (which will be described later). The transmitting circuit 11 or 21 then transmits, together with the current data SD0 or SD1, the synchronous signal F0 or F1 and time data T0 or T1, as part of the data frame I0 or I1.

As shown in FIG. 4A, the digital data frame T0 includes, apart from the current data SD0, a frame synchronous signal SY, the synchronous signal F0, the time data T0, and a check signal CH0. The frame synchronous signal SY is for the identification of the frame. The area for the synchronous signal F0 is "1" when the synchronous signal exists, and is "0" when the synchronous signal does not exist. The synchronous signal also acts as a flag indicating whether or not the data in the following area T0 is significant. If the flag F0 is "1", it indicates that the data in the area T0 is significant. If the flag F0 is "0", the data in the area T0 is insignificant, and is disregarded at the receiving terminal. A check signal CH0 is added for error detection.

Digital data frame I1 has a format as shown in FIG. 4B, which is similar to that of the digital data frame I0 and includes a frame synchronous signal SY identical to that of the digital data frame I0, current data SD1, a synchronous signal F1, a time data T1 and a check signal CH1.

The data frames I0 and I1 are transmitted from the transmitting circuits 11 and 21 at any convenient time. This means that the time point of the transmission with reference to the time point of occurrence of the clock signal may vary from one occasion to another.

When transmitting the digital data frame, each of the transmitting circuits 11 and 21 produces a transmission signal R0TT or R1TT, which may consist of a pulse produced at the time of the transmission.

The time point of transmission of the data frame I0 or I1 is therefore defined as or represented by the time point at which the transmission of the data frame I0 or I1 is commenced (i.e., at which the foremost part of the frame synchronous signal SY is transmitted). The Expression "the time point of transmission of the synchronous signal F0 or F1" will be sometimes used, but this means "the time point of transmission of the data frame I0 or I1 including the synchronous signal F0 or F1".

Signal receiving circuits 12 and 22 receive data I1 and I0 transmitted from the transmitting circuits 11 and 21 of the opposite terminals SS2 and SS1, and produce current data RY0 and RY1 which are, significantly, identical to the data SD1 and SD0, respectively. The data RY0 and RY1 are transferred to the relay devices 4 and 8 to be used for calculation for protection. When the received data frame I1 or I0 contains the synchronous signal F1 or F0, the receiving circuit 12 or 22 also produces a reception signal R0TR or R1TR indicating the reception of the synchronous signal F1 or F0, and the time data R0T1 or R1T0, which is in the significance, identical to the time data T1 or T0. Each of the reception signals R0TR and R1TR may consist of a pulse produced when the synchronous signal F1 or F0 is received.

The time data forming circuit 14 is responsive to the transmission signal R0TT, the reception signal R0TR, the time data R0T1 and the clock signal S0, and produces a synchronous signal F0 and time data T0. The value of the time data T0 is given by:

$$t_0 = T1 + t_2$$

where $t_0$ represents the time point of reception of the synchronous signal from the terminal SS2 with reference to the time point of occurrence of the clock pulse S0A (as expressed by the time length from the preceding occurrence of the clock pulse until the reception of the synchronous signal), T1 represents a value indicated by the time data R0T1, i.e., by the time data T1, whose significance will be described later, $t_2$ represents the time point of transmission of the synchronous signal F0 toward the terminal SS2 with reference to the time point of occurrence of the clock pulse S0A.

Upon next occurrence of the clock pulse S0A after the reception of the synchronous signal from the terminal SS2, the transmitting circuit 11 transmits the synchronous signal F0 and the time data T0 as part of the data frame I0.

The time data forming circuit 24 receives the transmission signal R1TT and the clock signal S1 and produces the synchronous signal F1 and the time data T1. The value of the time data T1 indicates the time point $t_1$ of transmission of the synchronous signal toward the terminal SS1 with reference to the time point of occurrence of the clock signal S1A.

Figure 7:
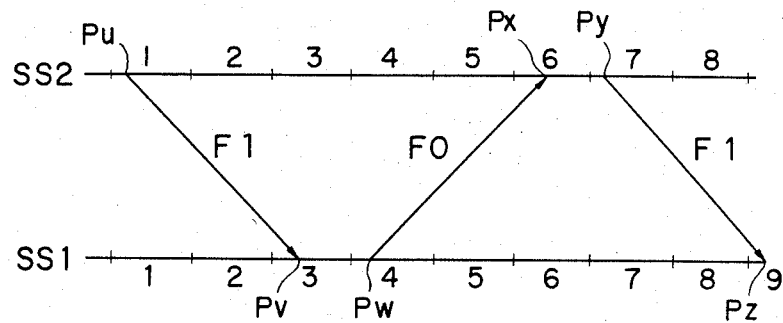

The transmission time detecting circuits 17 and 27 respectively receive the clock signals S0 and S1, the transmission signals R0TT and R1TT, and the reception signals R0TR and R1TR, and determine, in accordance with them, approximate value TD* of the transmission time, i.e., the transmission time as expressed by the number of the clock periods. More particularly, the transmission time TD* is related to the interval between the transmission of the synchronous signal at one terminal and the reception of the same synchronous signal at the opposite terminal, with the reception taking place in a TD*-th clock period as counted from the clock period in which the transmission took place. The calculation of TD* is accomplished according to the principle shown in FIG. 7.

First, it is assumed that the time deviation $\Delta T$ is controlled to be substantially zero, and the transmission times equal to each other, i.e., $$TD1 = TD0 = TD$$

As illustrated, a synchronous signal (or a data frame containing it) is transmitted from the terminal SS2 in a clock period Pu and is received at the terminal SS1 in a clock period Pv, and a synchronous signal is transmitted from the terminal SS1 in the next clock period Pw and is received at the terminal SS2 in a clock period Px. Then, a synchronous signal is transmitted from the terminal SS2 in the next clock period Py and is received at the terminal SS1 in a clock period Pz. Thereafter, exchange of a synchronous signal continues in a similar manner.

Now, the number of clock periods Px−Pu (which is 5 in the illustrated example) from transmission of a synchronous signal at the terminal SS2 until the first subsequent reception of a synchronous signal at the terminal SS2 is detected. If TD* represents an approximate value of the transmission time TD as expressed by the number of clock periods, then $$2TD^* + 1 = (Px - Pu)$$

Therefore, $$TD^* = \tfrac{1}{2}\{(Px - Pu) - 1\}$$

In the illustrated example, $$TD^* = \tfrac{1}{2}\{5 - 1\} = 2$$

Thus, it is known that the synchronous signal received at the terminal SS2 was transmitted at the terminal SS1 two clock periods before. To detect (Px−Py), the clock pulses S1A may be counted from reception of the transmission signal R1TT until reception of the reception signal R1TR.

The transmission time detecting circuit 27 determines the transmission time TD* in a manner described above, and produces data K1 indicating the thus-determined transmission time TD*.

The transmission time detecting circuit 17 of the terminal SS1 determines the transmission time TD* in accordance with a similar equation:

$$TD^* = \tfrac{1}{2}\{(Pz - Pw) - 1\}$$

and produces data K0 indicating the result of the calculation.

The data K0 and K1 are aggregated at the aggregating circuits 16 and 26, together with the current data RY0 and RY1, and are supplied to the relay devices 4 and 8, and are used to determine or identify at which time point or in which clock period the respective current data are sampled.

In addition to determining the transmission time TD* as described above, the transmission time detecting circuit 27 of the terminal SS2 produces a remainder signal L1 whose value is given by:

$$L1 = mod\left(\frac{Pu + Px - 1}{2}\right)$$

there, mod represents a function determining the remainder of division. Since Px and Pu are both an integer, L1 is either 0 or ½.

The time deviation detecting circuit 25 receives the reception signal R1TR, the time data R1T0, the remainder signal L1 and the clock signal S1 and determines the time deviation ΔT of the occurrence of the clock pulse S1A at the terminal SS2 with reference to occurrence of the clock pulse S0A at the opposite terminal SS1. The time deviation ΔT is determined in accordance with the equation:

$$\Delta T = \frac{t_3 - T0}{2}$$

where $t_3$ represents the time point of the reception (R1TR) of the synchronous signal F0 from the terminal SS1 with reference to the occurrence of the clock pulse S1A, and T0 represents the value indicated by the time data T0.

The time data forming circuits 14 and 24 and the time deviation detecting circuit 25 each include a counter to produce data on the time points of transmission and reception of the synchronous signal with reference to the clock pulse.

Now the principle of determining the time deviation ΔT will be described.

The time chart of FIG. 5 shows the time points of occurrence of the clock pulses S0A, S1A and transmission and reception of the synchronous signals F0, F1. In the illustrated example, the clock pulse S1A is leading or in advance of the clock pulse S0A. A data frame I1 containing the synchronous signal F1 and the time data T1 transmitted from a time point $t_a$ travels through the transmission path and reaches the terminal SS1. If TD1 is the transmission time, the time point $t_b$ at which the data frame is received at the terminal SS1 is given by:

$$t_b = t_a + TD1$$

The data frame I0 transmitted in the next clock period after the reception of the synchronous signal F1 contains the synchronous signal F0 and the time data T0. The data frame I0 with the synchronous signal F0 travels the same transmission path in the reverse direction, and reaches the terminal SS2. If the time point of the transmission is $t_c$, and the transmission time is TD0, the time point $t_d$ of the reception is given by:

$$t_d = t_c + TD0$$

The data frame F1 transmitted in the next clock period contains the synchronous signal F1 and the time data T1. The exchange of the synchronous signals F0, F1 (and the time data T0, T1) between the terminals SS1, SS2 is continued in a similar manner.

The value of the time data T1 of the data frame I1 transmitted from the terminal SS2 at the time point $t_a$ indicates the time point $t_1$ of such transmission with reference to the occurrence of the clock pulse S1A (the delay from the preceding clock pulse S1A). At the terminal SS1, the time point $t_0$ of the reception of the above data frame I1 with reference to the occurrence of the clock pulse S0A is detected. The time data T0 of the data frame I0 transmitted from the terminal SS1 at the time point $t_c$ has a value given by:

$$T0 = T_0 - T1 + t_2 \qquad (1)$$

Here, $t_2$ represents the time point of the transmission ($t_c$) of the data frame I0 with reference to the occurrence of the clock pulse S0A. At the terminal SS1, the time point $t_3$ of the reception of the above data frame T0 with reference to the occurrence of the clock pulse S1A is detected and the time deviation $\Delta T$ is calculated in accordance with the following equation.

$$\Delta T = \frac{t_3 - T0}{2} \quad (2)$$

The reason why the above equation gives the time deviation is as follows:

First, it will be seen from FIG. 5, $$T1 + TD1 = \Delta t_0 \quad (3)$$

$$\Delta T + t_2 + TD0 = t_3 \quad (4)$$

In ordinary transmission paths, practically the following equation holds:

$$TD0 \approx TD1 \quad (5)$$

From the equations (3), (4), (5), $$\Delta T = \frac{t_3 - (t_0 - T1 + t_2)}{2} \quad (6)$$

Since $(t_0 - T1 + t_2)$ equals the value of T0, $$\Delta T = \frac{t_3 - T0}{2}$$

Thus, the equation (2) is derived.

In the above description on the principle of determining the time deviation $\Delta T$, it was assumed that the time deviation $\Delta T$ and the transmission times TD0, TD1 are relatively small. The following description will show how, in general, the time deviation $\Delta T$ can be determined for any given time deviation $\Delta T$ and transmission times TD0, TD1.

Figure 6:
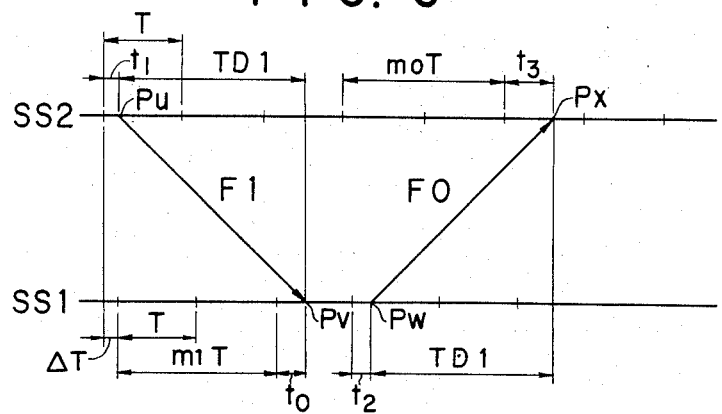

The time chart of FIG. 6 illustrates a situation where the transmission times TD0, TD1 are longer than one period of the clock pulses S0A, S1A. It will be seen from FIG. 6 that the following relationships hold:

$$T1 + TD1 = \Delta T + m_1 T + t_0 \quad (7)$$

$$\Delta T + t_2 + TD1 = m_0 T + t_3 \quad (8)$$

In ordinary transmission paths, the equation (5) holds, so that from the equations (5), (7), (8), we obtain:

$$\Delta T = \frac{1}{2} \{t_3 - T0 - (m_1 - m_0)T\} \quad (10)$$

As illustrated in FIG. 6, a synchronous signal is transmitted from the terminal SS2 in a clock period Pu and is received at the terminal SS1 at a clock period Pv, and a synchronous signal is transmitted in return, from the terminal SS1 in a clock period Pw and is received at the terminal SS2 in a clock period Px. If the approximate values of the transmission times as expressed by the number of clock periods are represented by $m_1$, $m_0$, then $$m_1 = Pv - Pu$$

$$m_0 = Px - Pw$$

If $$Pw = Pv + 1$$

Then, $$m_1 - m_0 = 2Pv - (Pu + Px - 1)$$

$$\Delta T = \frac{1}{2}\{t_3 - T0\} - PvT + (T/2)(Pu + Px - 1)$$

Since $\Delta T$ is always smaller than T, the term PvT (a multiple of T) can be disregarded. Furthermore, if the remainder of division of:

$$\frac{Pu + Px - 1}{2}$$

is expressed as:

$$mod\left(\frac{Pu + Px - 1}{2}\right)$$

then, the equation (10) can be modified as follows:

$$T = \frac{1}{2}(t_3 - T0) + T \cdot mod\left(\frac{Pu + Px - 1}{2}\right) \quad (11)$$

Here, Pu and Px are values which are known at the terminal SS2, so that the calculation of the equation (11) can always be readily made at the terminal SS2. It should also be noted that the equation (11) always holds regardless of the values of the transmission times.

Figure 10:
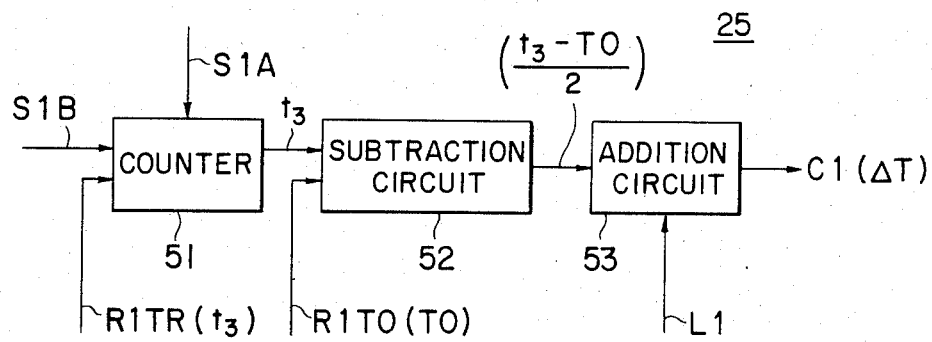
FIG. 10 is a block diagram showing an example of the time deviation detecting circuit 25 shown in FIG. 2.

FIG. 10 shows in detail an example of the time deviation detecting circuit 25 performing the above-described calculation to determine $\Delta T$.

A counter 51 receives and is reset by the clock pulse S1A and starts counting the clock pulses S1B, and stops counting when it receives the reception signal R1TR. The count value of the counter 51 at the time when it stops counting indicates the time $t_3$ (FIG. 6).

A subtraction circuit 52 receives the output $t_3$ of the counter 51 and the time data R1T0, and determines:

$$\frac{t_3 - T0}{2}$$

An addition circuit 53 receives the output $(t_3 - T0)/2$ of the subtraction circuit 52 and the remainder signal L1, and determines $$\frac{t_3 - T0}{2} + L1 \times T$$

Here, $$L1 \text{ equals } mod\left(\frac{Pu + Px - 1}{2}\right),$$

so that the above equation is identical, in its significance, to the equation (11) and yields the time deviation $\Delta T$. A signal C1 indicating the thus-determined time deviation $\Delta T$ is supplied from the time deviation detecting circuit 25, as a phase adjusting signal, to the clock signal generating circuit 23, and is used for adjusting the timing of the occurrence of the clock signal such that the time deviation ΔT is made smaller or to be zero.

Figure 11:
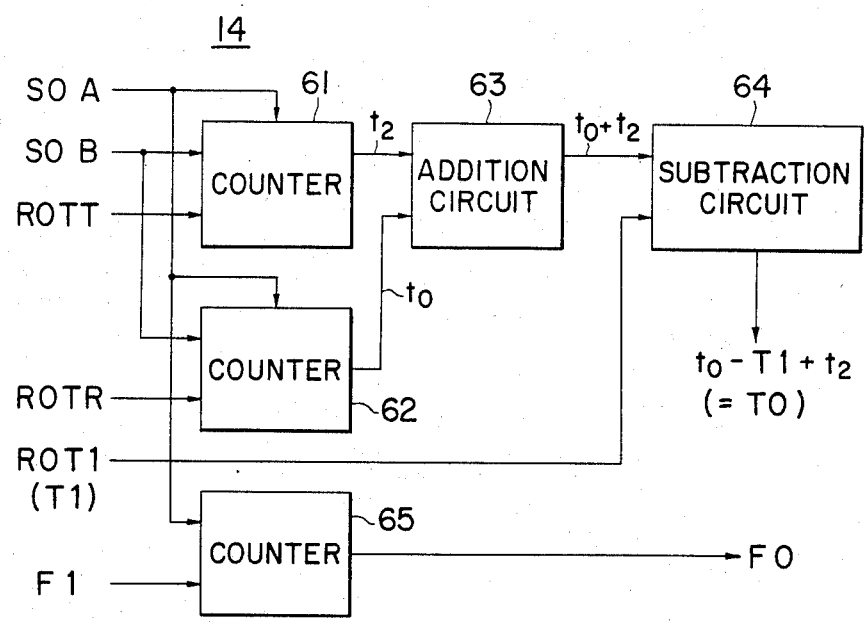
FIG. 11 is a block diagram showing an example of the time data forming circuit 14 shown in FIG. 2.

FIG. 11 shows in detail an example of the time data forming circuit 14 of the terminal SS1.

A counter 61 receives and is reset by the clock pulse S0A and starts counting the clock pulses S0B, and stops counting and outputs the count value when it receives the transmission signal R0TT. The count value of the counter 61 at the time when it stops counting indicates the time $t_2$ (FIG. 6). A second counter 62 is also reset by the clock pulse S0A and starts counting the clock pulses S0B and stops counting and outputs the count value when it receives the reception signal R0TR. The count value of the counter 62 at the time when it stops counting indicates the time $t_0$. An addition circuit 63 adds the outputs $t_2$ and $t_0$ and produces a signal indicative of the sum $(t_0+t_2)$. A subtraction circuit 64 receives the output $(t_0+t_2)$ from the addition circuit 63 and the time data R0T1 and produces a signal indicative of the difference $(t_0+t_2)-T1=t_0-T1+t_2$. This value constitutes the value of the time data T0 and hence the output of the subtraction circuit 64 is used as the time data T0.

A further counter 65 is provided to be reset when a synchronous signal F0 is received, and to start counting the clock pulses S0A. Upon counting up to a predetermined value (e.g., 1 in the example of FIG. 6; or $(N_0+1)$ in the example of FIG. 8), the counter 65 produces a signal used as the synchronous signal F1. By the function of the counter 65, the synchronous signal F0 is transmitted in a specific clock period, i.e., a specific number of clock periods after the reception of the synchronous signal F1. The counter 65 has an additional function of producing the synchronous signal F0 when it does not receive the signal F1 continuously over a predetermined time length. This function enables generation of a first synchronous signal after the data exchange devices are initially powered.

Figure 12:
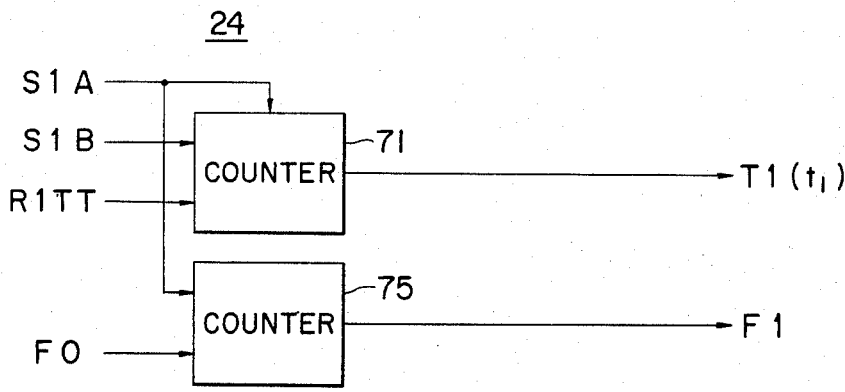
FIG. 12 is a block diagram showing an example of the time data forming circuit 24 shown in FIG. 2.

FIG. 12 shows in detail an example of the time data forming circuit 24 of the terminal SS2.

A counter 71 is similar to the counter 61 of FIG. 11 and is reset by the clock pulse S1A and counts the clock pulses S1B, until the transmission signal R1TT is supplied. The ultimate count value of the counter 72 indicates the time $t_1$ and a signal indicative of $t_1$ is used as the time data T1.

Figure 8:
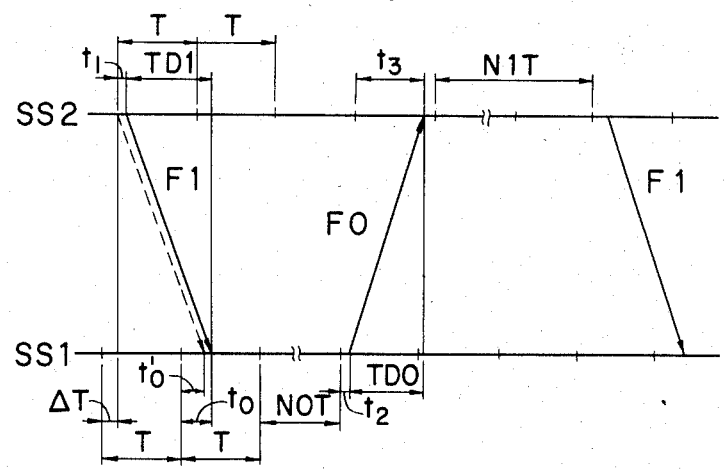

A second counter 75 is similar to the counter 65 of FIG. 11 and is reset by the synchronous signal F0 and counts the clock pulses S1A and when the count value reaches a predetermined value (e.g., 1 in the example of FIG. 6, or $(N_1+1)$ in the example of FIG. 8), it produces the synchronous signal F1. Unlike the counter 65, the counter 75 need not have the above-mentioned additional function of producing the synchronous signal after the initial power-on.

The function of the aggregation circuits 16, 26 is to aggregate or combine the data K0, K1 and the data RY0, RY1, without modifying their significance, and to output the aggregation or the combination as data RD0, RD1. When the data K0, K1 and RY0, RY1 consist of parallel bits, the aggregating circuits are formed of the portions or locations where the conductors carrying the respective bits are physically junctioned.

In the embodiment described above, time points of transmission and reception of a synchronous signal are respectively defined as or represented by time points of transmission and reception of the foremost part of a data frame containing the synchronous signal. But they can alternatively be defined as time points of transmission and reception of any other part of the data frame, e.g., of the synchronous signal itself.

The time data T0, T1 have been described as being formed after actually detecting transmission, but may alternatively be formed based on an estimate or schedule of the time point of the transmission.

The values of the time data T0, T1 have been described as being determined in accordance with the values which represent time lengths $t_0$, $t_1$, $t_2$, $t_3$ by which the respective events (transmission and reception) lag behind the preceding clock pulse S0A or S1A, but may alternatively be determined in accordance with the values which represent the time lengths by which the respective events are in advance of the following clock pulse S0A or S1A. In this case, in place of the equation (1), the following equation holds:

$$T0 = (T - t_0) - (T - T1) + (T - t_2)$$
$$= T - (t_0 - T1 + t_2)$$

And, in place of the equation (11), the following equation holds:

$$\Delta T = \frac{1}{2}\{(T - t_3) - T0\} + T \cdot mod\left(\frac{Pu + Px - 1}{2}\right) \quad (12)$$

$$= \frac{1}{2}[(T - t_3) - \{T - (t_0 - T1 + t_2)\}] + T \cdot mod\left(\frac{Pu + Px - 1}{2}\right)$$

$$= -\frac{1}{2}\{t_3 - (t_0 - T1 + t_2)\} + T \cdot mod\left(\frac{Pu + Px - 1}{2}\right)$$

It will thus be seen that the time deviation ΔT can be determined by substantially identical calculations, apart from the difference in sign. The recitation in the claims as to the equation should therefore be interpreted as covering any modification or equivalent to the recited equation.

In the embodiment described above, the entirety of the time data T0 or T1 is transmitted being contained in a single data frame. But the time data may be transmitted by means of subcommutation technique. That is, the time data is divided and fractions of the time data are successively transmitted as part of respective data frames. In this case the flag F0, F1 may be used to indicate the beginning of the transmission of the time data.

In the embodiment described above, the synchronous signal F0, F1 is transmitted in the first clock period after the clock period in which the synchronous signal F1, F0 from the opposite terminal is received. But such transmission can alternatively be carried out in the $M_0$-th $(M_0=N_0+1)$ or $M_1$-th $(M_1=N_1+1)$ ($M_0$, $M_1$ being predetermined natural numbers) clock period (as shown in FIG. 8) after the clock period in which the synchronous signal is received. In such a case, the time deviation $\Delta T$ can be determined in a similar manner, i.e., according to the following equation:

$$\Delta T = \frac{1}{2} \{t_3 - T_0\} + T \cdot mod\left(\frac{Pu + Px - 1 - N_0}{2}\right) \quad (13)$$

or, substituting $M_0 = N_0 + 1$, $$\Delta T = \frac{1}{2} \{t_3 - T_0\} + T \cdot mod\left(\frac{Pu + Px - M_0}{2}\right) \quad (13')$$

Here, $M_0$ is known, so that $\Delta T$ can be determined relying on the same consideration as applied to the equation (11).

The approximate value TD* of the transmission time (as expressed by the number of clock periods) can be similarly determined. That is, at the terminal SS2, $$TD^* = \frac{1}{2}\{(Px - Pu) - 1 - N_0\}$$

$$TD^* = \frac{1}{2}\{(Px - Pu) - M_0\}$$

At the terminal SS1, $$TD^* = \frac{1}{2}\{(Pz - Pw) - 1 - N_1\}$$

or $$TD^* = \frac{1}{2}\{(Pz - Pw) - M_1\}$$

The transmission times TD0 and TD1 have been assumed to be identical. But the time deviation $\Delta T$ can be determined even if there is a difference between TD0 and TD1 as far as such difference, say $\epsilon$, is known. This is because, if one uses, instead of the equation (5), $$TD0 = TD1 + \epsilon \quad (14)$$

Then, in place of the equation (11), the following equation holds:

$$\Delta T = \frac{1}{2}\{t_3 - T_0 - \epsilon\} + T \cdot mod\left(\frac{Pu + Px - 1}{2}\right) \quad (15)$$

Thus, $\Delta T$ can be determined in a similar manner.

As a modification, a delay line having a delay time equal to the difference $\epsilon$ may be inserted in or added to the transmission path in such a manner that synchronous signal which is caused to travel through the delay line is transmitted in a direction with the shorter transmission time, so that the transmission times of the transmissions in the two ways are equal to each other.

Figure 9:
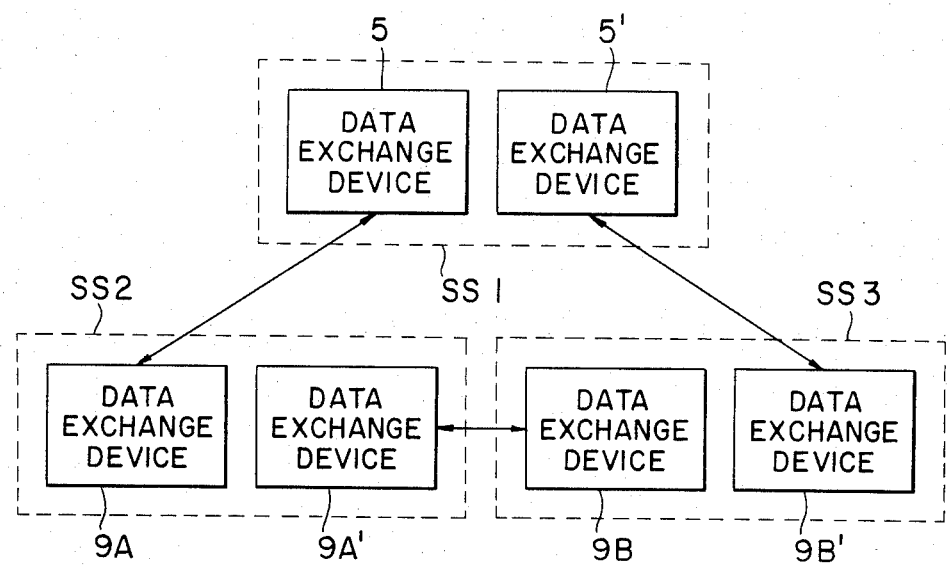
FIG. 9 is a block diagram showing exchange of a synchronous signal and of data between three terminals.

The invention has been described as applied to a situation where synchronization between two terminals are attempted, but is of course applicable where synchronization between three or more terminals is to be attained. For instance, where the sampled current data are exchanged between three terminals SS1, SS2 and SS3 as shown in FIG. 9, the synchronous signal and time data are exchanged between the terminals SS1 and SS2, and between the terminals SS1 and SS3, with the terminal SS1 acting as the master terminal and the terminals SS2 and SS3 acting as the servant terminals, and the clock signals of the terminals SS2 and SS3 are phase-adjusted to be in synchronism with the clock signal of the terminal SS1. The synchronous signals F0, F1 are exchanged between the terminals SS2 and SS3 for the purpose of determination of the transmission time TD*. (It is not necessary to exchange the synchronous signal and the time data between the terminals SS2 and SS3 for the purpose of synchronization.) At each terminal, two data exchange devices (5,5'; 9A,9A' and 9B,9B' being similar to that 9 of FIG. 9) are provided, but they may share a single synchronous signal generating circuit (similar to that 13 or 23 of FIG. 2).

As will be appreciated from the foregoing description, the synchronous signal F0, F1 may be formed of a single bit, and the time data T1 needs only to indicate a value within the range of 0 to T, while the time data T0 needs only to indicate a value within the range of 0 to 2T, so that the amount of information to be exchanged for synchronization is small. Moreover, the length of time $(t_a - t_d)$ from transmission and subsequent reception of a signal for synchronization is relatively short, so that the time deviation can be promptly eliminated. Furthermore, the system according to the invention is convenient in that it is not necessary to fix the time point of transmission of a data frame relative to the clock signal.

What is claimed is:

1. A sampling synchronizing method for use in a protective relay system for an electric power system having two or more terminals at which electrical quantity is sampled, two of the terminals being coupled to form a pair, said sampling at each terminal being made in synchronism with a clock signal produced at each terminal, and electrical quantity data obtained by the sampling at each terminal of said pair is transmitted to the opposite terminal of said pair to be used for protection at said opposite terminal, the clock signals at the terminals of said pair having the same frequency, wherein synchronous signals F0, F1, are transmitted from each terminal of said pair toward the opposite terminal;

time data T1 is transmitted from one terminal SS2 of said pair toward the other terminal SS1 of said pair, in association with the synchronous signal, the time data T1 indicating a time point $T_1$ of the transmission of the synchronous signal F1 toward said other terminal with reference to occurrence of the clock signal at said one terminal;

time data T0 is transmitted from said other terminal toward said one terminal, in association with the synchronous signal F0 in an $M_0$-th clock period ($M_0$ being a predetermined natural number) after the reception of the synchronous signal F1 associated with the time data T1 from said one terminal, the time data T0 indicating a value given by:

$$t_0 - T_1 + t_2$$

where $t_0$ represents a time point of the reception of the synchronous signal F1 associated with the time data T1 from said one terminal SS2 with reference to occurrence of the clock signal at said other terminal SS1, T1 represents a value indicated by the time data T1, and $t_2$ represents a time point of said transmission of the synchronous signal F0 associated with the time data T0 toward said one terminal SS2 with reference to occurrence of the clock signal at said other terminal SS1, and a time deviation $\Delta T$ in the occurrence of the clock signal between said pair of terminals is determined at said one terminal in accordance with the time data T0 and a time point $t_3$ of the reception of the synchronous signal F0 associated with the time data T0 from said other terminal with reference to occurrence of the clock signal; and the timing of the occurrence of the clock signal at said one terminal is adjusted in accordance with the time deviation $\Delta T$.

2. A method according to claim 1, wherein $M_0$ is 1.

3. A method according to claim 1, wherein a transmission signal R1TT is produced at said time point $t_1$ at said one terminal SS2, and said time data T1 is formed in accordance with the transmission signal R1TT and the clock signal.

4. A method according to claim 1, wherein a reception signal R0TR is produced at said time point $t_0$ at said other terminal SS1, a transmission signal R0TT is produced at said time point $t_2$ at said other terminal SS1, and said time data T0 is formed in accordance with the reception signal R0TR, the transmission signal R0TT, the clock signal and the time data T1.

5. a method according to claim 1, wherein a reception signal R1TR is produced at said time point $t_3$ at said one terminal SS2, and said time deviation $\Delta T$ is determined in accordance with said time data T0 and said reception signal R1TR.

6. A method according to claim 1, wherein the time deviation $\Delta T$ is determined in accordance with the following equation:

$$\Delta T = \frac{1}{2}(t_3 - T0) + T \cdot mod\left(\frac{Pu + Px - M_0}{2}\right)$$

where Px represents a clock period in which the synchronous signal F0 associated with the time data T0 is received at said one terminal SS2, Pu represents a clock period in which the immediately preceding transmission of the synchronous signal F1 associated with the time data T1 which has been used for determining the time data T0 from said one terminal SS2 took place, and mod represents a function determining the remainder of division.

7. A protective relay system in an electric power system having two or more terminals, two of the terminals being coupled to form a pair, and relay devices each provided at each of the terminals of said pair for sampling electrical quantity in synchronism with a clock signal produced at each of the terminals of said pair and producing electrical quantity data indicating the sampled electrical quantity, and data exchange devices each provided at each of the terminals of said pair transmitting the electrical quantity data toward the opposite terminal of said pair and receiving the electrical quantity data transmitted from the opposite terminal of said pair, said relay device at each terminal of said pair being responsive to the electrical quantity data transmitted from the opposite terminal protecting the electric power system, the clock signals at the terminals of said pair having the same frequency, said data exchange device at each terminal comprising a clock signal generating circuit periodically generating said clock signal, and a transmitting circuit transmitting synchronous signals F0, F1 toward the opposite terminal, the data exchange device 9 of one terminal SS2 of said pair comprises a time data forming means 24 producing time data T1 indicating the time point $t_1$ of the transmission of the synchronous signal F1 toward the other terminal SS1 with reference to occurrence of the clock signal at said one terminal SS2, the transmitting circuit 21 of said one terminal SS2 transmits the time data T1 in association with the synchronous signal F1, the transmitting circuit 11 of said other terminal SS1 transmits the synchronous signal F0 in an $M_0$-th clock period ($M_0$ being a predetermined natural number) after the reception of the synchronous signal F1 associated with the time data T1 from said one terminal, the data exchange device 5 of said other terminal SS1 further comprises a time data forming means 14 for producing time data T0 indicating a value given by $$t_0 - T1 + t_2$$

where $t_0$ represents a time point of the reception of the synchronous signal F1 associated with the time data T1 from said one terminal SS2 with reference to occurrence of the clock signal at said other terminal SS1, T1 represents a value indicated by the time data T1, and $t_2$ represents a time point of said transmission of the synchronous signal F0 toward said one terminal SS2 with reference to occurrence of the clock signal at said other terminal SS1, the transmitting circuit 11 of said other terminal SS1 also transmits the time data T0 in association with said synchronous signal F0, the data exchange device 9 of said one terminal SS2 further comprises a time deviation detecting means 25 for determining time deviation $\Delta T$ in the occurrence of the clock signal between said pair of terminals, in accordance with the time data T0, and the time point $t_3$ of reception of the clock signal F0 associated with the time data T0 from said other terminal SS1 with reference to occurrence of the clock signal at said one terminal SS2, and the clock signal generating circuit 23 of said one terminal SS2 is responsive to the time deviation $\Delta T$ for so adjusting the timing of the occurrence of the clock signal as to make the deviation closer to zero.

8. A system according to claim 7, wherein $M_0$ is 1.

9. A system according to claim 7, wherein said transmitting circuit 21 of said one terminal SS2 produces a transmission signal R1TT at said time point $t_1$, and said time data forming means 24 of said one terminal SS2 is responsive to the transmission signal R1TT and the clock signal for producing said time data T1.

10. A system according to claim 7, wherein
the data exchange device 5 of said other terminal SS1 further comprises a receiving circuit 12 receiving the synchronous signal F1 and the time data T1 from said one terminal SS2 and producing a reception signal R0TR at said time point $t_0$, said transmitting circuit 11 of said other terminal SS1 produces a transmission signal R0TT at said time point $t_2$, and said time data forming means 14 of said other terminal SS1 produces said time data T0 in accordance with the reception signal R0TR, the transmission signal R0TT, the clock signal and the time data T1.

11. A system according to claim 7, wherein
said data exchange device 9 of said one terminal SS2 further comprises a receiving circuit 22 receiving the synchronous signal F0 and the time data T0 from said other terminal SS1 and producing a reception signal R1TR at said time point $t_3$, and said time deviation detecting means 25 is responsive to said time data T0 and said reception signal R1TR for determining the time deviation $\Delta T$.

12. A system according to claim 7, wherein
said time deviation detecting means 25 determines the time deviation $\Delta T$ in accordance with the following equation:

$$\Delta T = \frac{1}{2}(t_3 - T0) + T \cdot mod\left(\frac{Pu + Px - M_0}{2}\right)$$

where Px represents a clock period in which the synchronous signal F0 associated with the time T0 is received at said one terminal SS2, Pu represents a clock period in which the immediately preceding transmission of the synchronous signal F1 associated with the time data T1 which has been used for determining the time data T0 from said one terminal SS2 took place, and mod represents a function determining the remainder of division.

13. A system according to claim 7, wherein
the data exchange device of each terminal further comprises a transmission time detecting means 17, 27 determining a transmission time TD* as expressed by the number of clock periods, in accordance with the following equation $$TD^* = \frac{1}{2}\{(Pr - Pt) - M\}$$

where Pr represents a clock period in which the synchronous signal from the opposite terminal is received, Pt represents the clock period in which the immediately preceding transmission of the synchronous signal toward the opposite terminal took place, and M is a predetermined natural number related to the transmission and the immediately preceding reception of the synchronous signal at the opposite terminal, with the transmission taking place in the M-th clock period after the immediately preceding reception.

* * * * *